United States Patent
Tseng et al.

(10) Patent No.: US 6,773,115 B2
(45) Date of Patent: Aug. 10, 2004

(54) ADJUSTING APPARATUS FOR PROJECTION

(75) Inventors: Yung-Chuan Tseng, Chu-Nan (TW);
Chun-Yao Chen, Chu-Nan (TW);
Kuan-Chou Ko, Chu-Nan (TW)

(73) Assignee: Coretronic Corporation, Chu-Nan (TW)

(*) Notice: Subject to any disclaimer, the term of this patent is extended or adjusted under 35 U.S.C. 154(b) by 0 days.

(21) Appl. No.: 10/731,138

(22) Filed: Dec. 10, 2003

(65) Prior Publication Data
US 2004/0130686 A1 Jul. 8, 2004

(30) Foreign Application Priority Data
Jan. 8, 2003 (TW) .................................... 09220056 U

(51) Int. Cl.⁷ .................. G03B 21/28; G02B 7/182
(52) U.S. Cl. ..................... 353/78; 353/98; 359/872
(58) Field of Search .................. 353/77, 78, 98, 353/99; 359/849, 872, 873

(56) References Cited

U.S. PATENT DOCUMENTS 4,537,478 A * 8/1985 Richter ....................... 359/849
2002/0186352 A1 * 12/2002 Chen et al. .................... 353/98

* cited by examiner

Primary Examiner—Christopher Mahoney
(74) Attorney, Agent, or Firm—Bacon & Thomas PLLC

(57) ABSTRACT

An adjusting apparatus for projection comprises a carrier having a central screw hole and three rounded indentations around central screw hole, an adjusting frame having a plane section and a base section, and a holder. The center of the plane section has a circular concave dug a hole with a smaller aperture. A ball bearing is accommodated in the circular concave. The plane section of the adjusting frame has three screw holes corresponding to the rounded indentations. Three angle-adjusting bolts respectively insert through the screw holes to abut against the rounded indentations. Rotating the angle-adjusting bolts relative to each other varies the length of the angle-adjusting bolts calculated from the plane section of the adjusting frame to the carrier. Thereby, an angle adjustment of a mirror is achieved.

12 Claims, 4 Drawing Sheets

ADJUSTING APPARATUS FOR PROJECTION

BACKGROUND OF THE INVENTION

1. Field of the Invention

The invention relates to a projection apparatus, and more particularly to an adjusting apparatus that uses to adjust a mirror in the projection apparatus.

2. Description of the Related Art

In a projection apparatus, optical elements have to be precisely assembled for reflecting a projecting light beam at a predetermined angle and generating clear image frame without image deformation or aberration.

Referring to FIG. 1, an optical system of a conventional rear projection television 10 includes a casing 11, a base 12, a base frame 13 mounted on the base 12, and an optical engine 14 mounted on the base frame 13. A first mirror 15 is fixed in front of the optical engine 14 via a fastener 152 of a holder 151, and a second mirror 17 is disposed on the inner side of a rear cover 111. The light beam emitted from the optical engine 14 is projected onto the first mirror 15. The beam is then reflected onto the second mirror 17 from the first mirror 15, and finally is projected onto a screen 16, which constitutes the optical system.

In order to ensure that the first mirror 15 is positioned at a correct position relative to other optical elements of the rear projection television 10, the conventional optical elements should be had precision tolerance in manufacturing and assembling so as to increase the manufacturing cost of optical elements of the rear projection television 10. According to other approaches known in the art, a plurality of bolts 153 can be fastened onto the fastener 152 being used to fix the first mirror 15. The position of the first mirror 15 is adjusted by rotating the bolt 153. The first mirror 15 can be moved in a specific direction by manipulation of the adjusting means. The adjustment of the first mirror 15 can be done within a limited range, and does not simplify the assembly of the rear projection television 10.

SUMMARY OF THE INVENTION

One object of the invention is to provide an adjusting apparatus for projection, in which a first mirror can be quickly positioned at a proper position with an exact projection angle via adjusting a ball bearing and an adjusting bolt in various directions.

Another object of the invention is to provide an adjusting apparatus for projection, in which a first mirror can be shifted along its axial direction to increase the freedom of the first mirror.

In order to achieve the above and other objectives, an adjusting apparatus for projection comprises a carrier having a central screw hole and three rounded indentations around central screw hole, an adjusting frame having a plane section and base section connecting to the plane section, and a holder. The center of the plane section has a circular concave dug a hole with a smaller aperture. A ball bearing is accommodated in the circular concave. The plane section has three screw holes corresponding to the rounded indentations. Three angle-adjusting bolts respectively insert through the screw holes to abut against the rounded indentations. Rotating the angle-adjusting bolts relative to each other varies the length of the angle-adjusting bolts calculated from the plane section of the adjusting frame to the carrier. Thereby, an angle adjustment of a mirror is achieved. Furthermore, the plane section has an adjusting hole at its lower side. A retainer having a through hole externally extends from a top of the holder. One end of a spring is blocked by the retainer, and the other end of the spring is inserted into the adjusting hole. A shift-adjusting bolt inserts through the through hole and the spring, and screws to the adjusting hole. Thus, rotating the shift-adjusting bolt can achieve shifting adjustment for the first mirror. The base section has at least one slot corresponding to a positioning screw hole of the holder for guiding. At least one positioning bolt inserts through the slot to fix the adjusting frame to the holder.

DETAILED DESCRIPTION OF THE INVENTION

Figure 1:
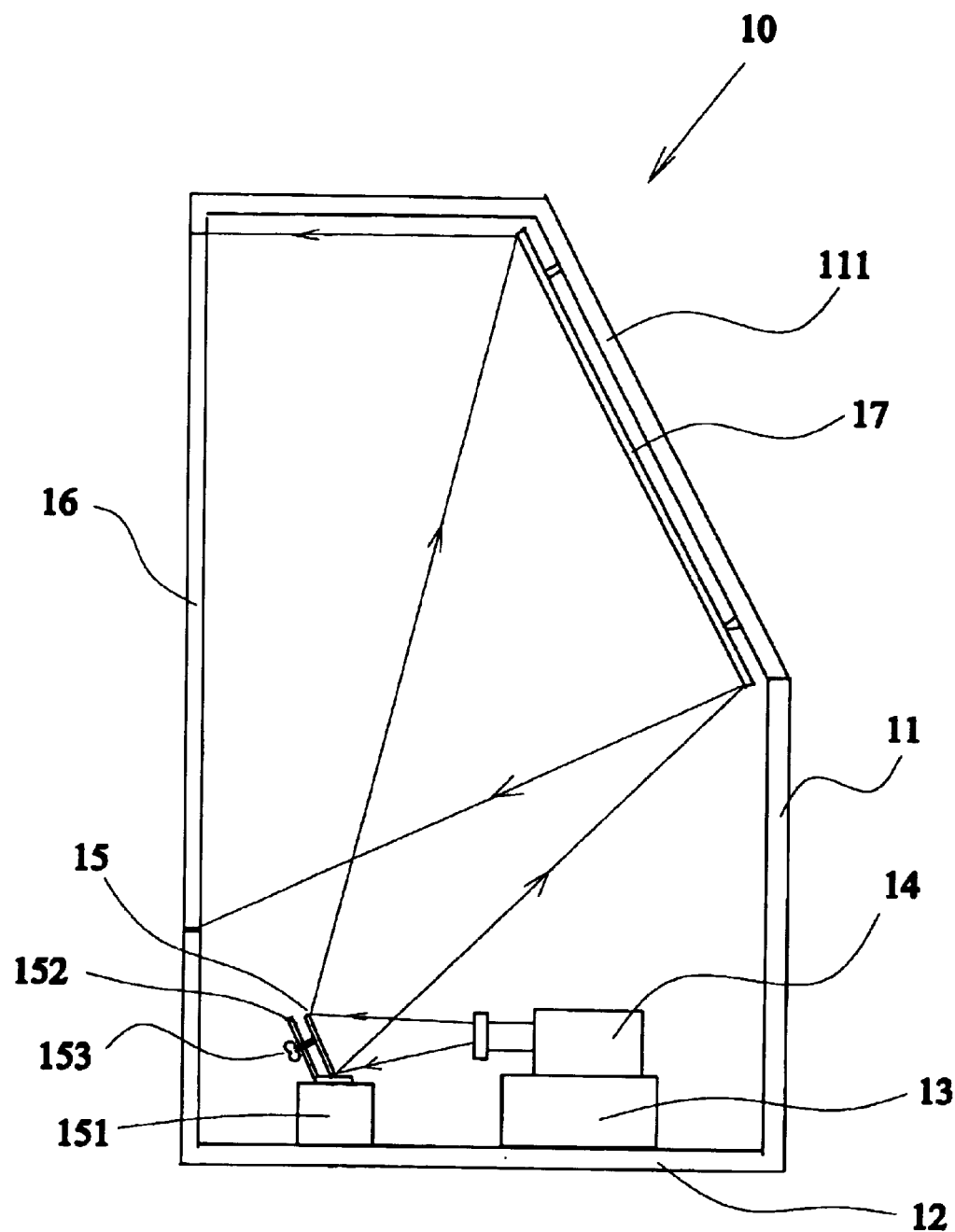
FIG. 1 is a schematic view illustrating an optical path of a rear projection television of the prior art.
Figure 2:
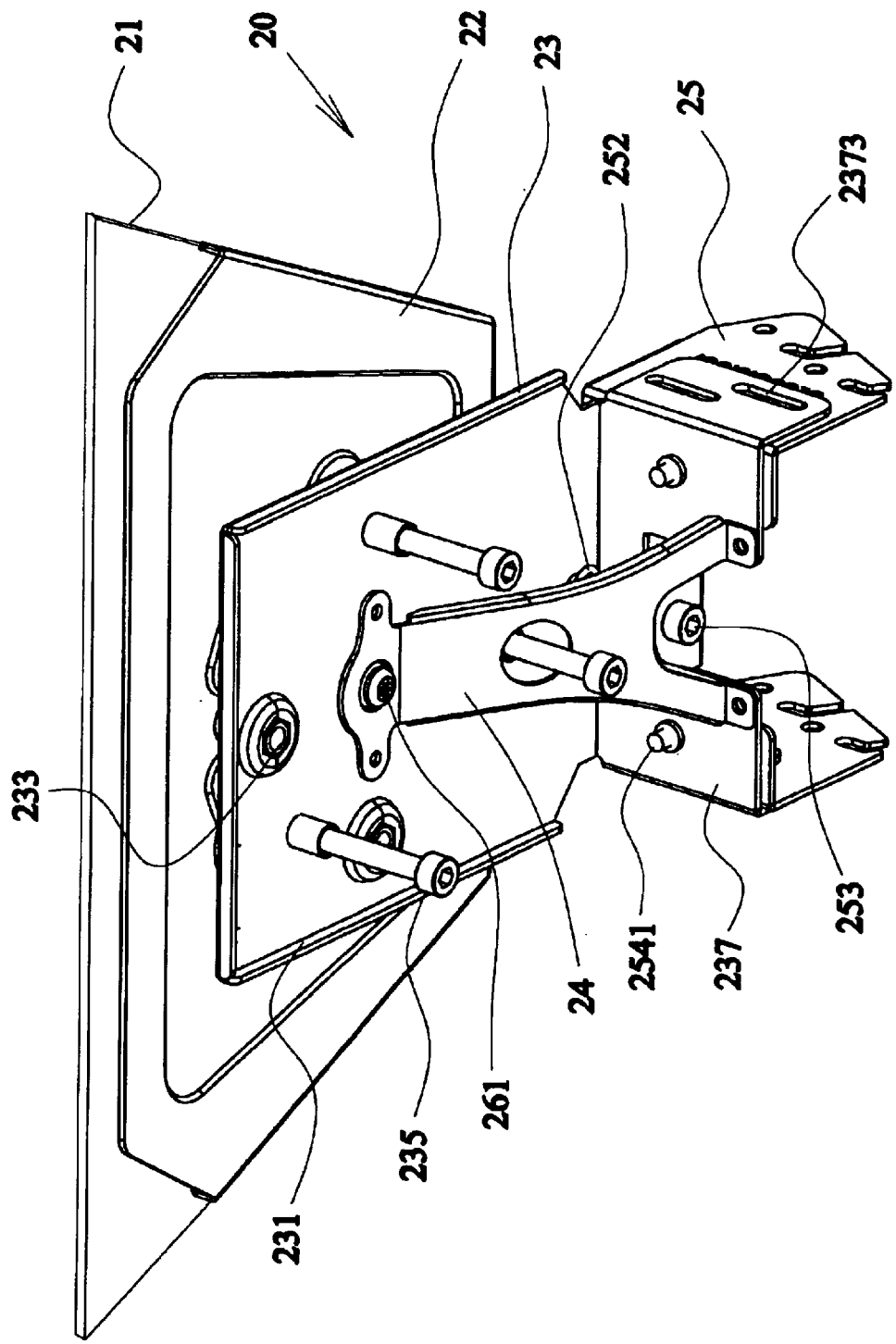
FIG. 2 is a perspective view of an adjusting apparatus for projection of the invention.

Referring to FIG. 2, an adjusting apparatus 20 for projection includes a first mirror 21, a carrier 22, an adjusting frame 23, a support plate 24, and a holder 25. The first mirror 21 is accommodated in the front of the carrier 22. The adjusting frame 23 is on the back of the carrier 22 and is fixed on the holder 25, for supporting the carrier 22. The support plate 24 is disposed on the back of the adjusting frame 23, for supporting the adjusting frame 23. Thereby, the adjusting apparatus 20 is accomplished.

Figure 3:
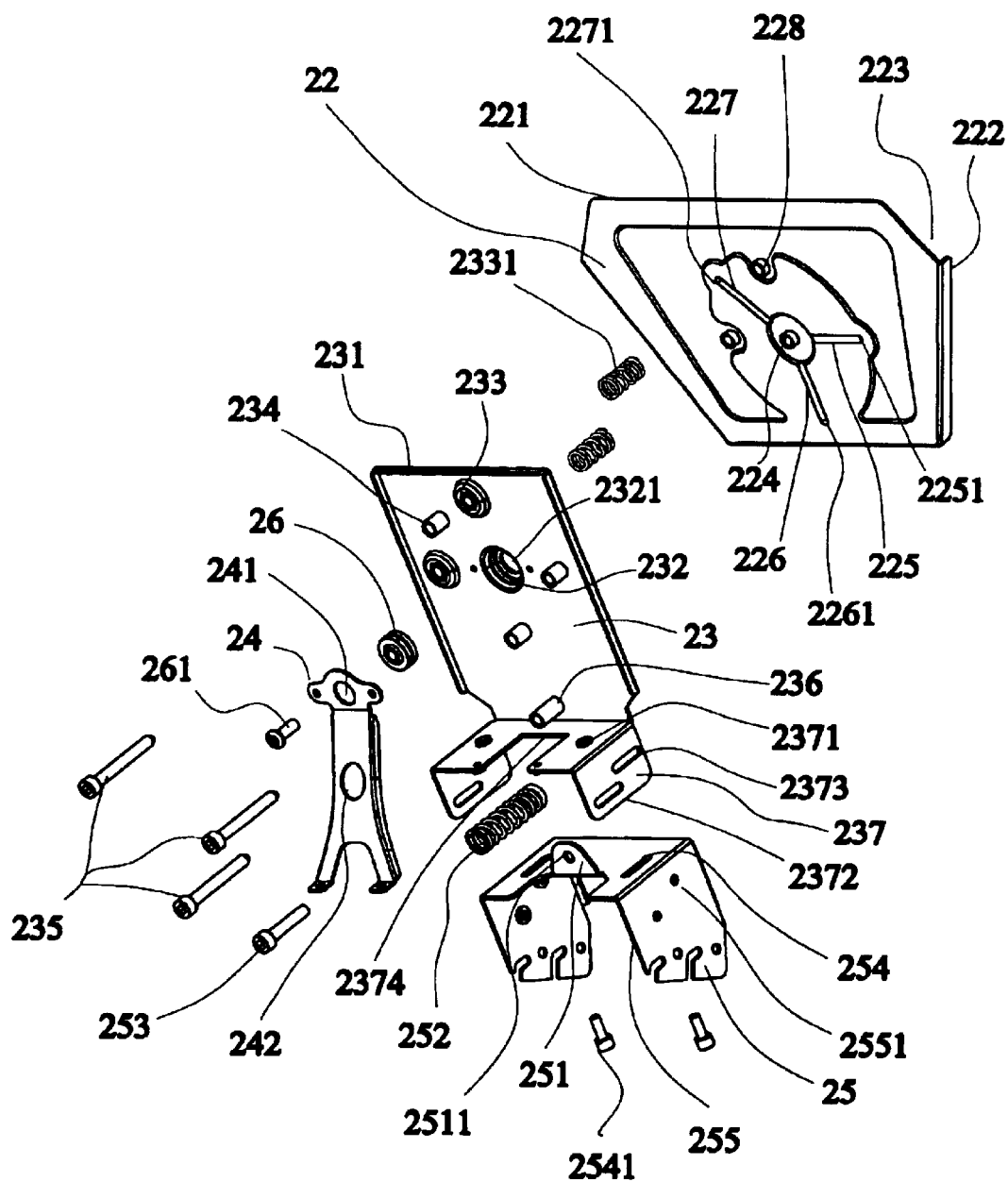
FIG. 3 is an exploded view of an adjusting apparatus for projection of the invention.

Referring to FIG. 3, a flange 222 is formed along a front periphery of the carrier 22, except an upper edge 221, to form a recess 223 for accommodating the first mirror 21. A central screw hole 224 is formed on the back of the carrier 22. Three slots 225, 226 and 227 radially extend from the central screw hole 224, respectively with rounded indentations 2251, 2261, and 2271 at their tips. The rounded indentations 2251, 2261 are spaced away from each other at an angle of about 90°, and the rounded indentation 2271 is placed on the opposite end of the rounded indentations 2251, 2261. A pin 228 is formed at each side of the slot 227 and respectively opposite to the rounded indentations 2251, 2261.

The adjusting frame 23 has a plane section 231 and a base section 237 connecting to the plane portion 231. The center of plane section 231 has a circular concave 232 dug a hole 2321 with a smaller aperture. The hole 2321 is on the bottom of the circular concave 232. A ball bearing 26 having a central hole is accommodated inside the circular concave 232, and a fastening bolt 261 passes through the central hole and screws to the central screw hole 224 of the carrier 22 for fixing the ball bearing 26 in the circular concave 232 and connecting the plane section 231 to the carrier 22. The plane section 231 has two restricting bolts 233 corresponding to the pins 228 of the carrier 22, so that two springs 2331 are positioned between the carrier 22 and the plane section 231 of the adjusting frame 23. Two ends of each spring 2331 are allowed to stretch between the pins 228 and the restricting bolts 233 within a limited range. The plane section 231 is installed three screw holes 234 corresponding to the rounded indentations 2251, 2261 and 2271. Three angle-adjusting bolts 235 respectively pass through the screw holes 234 to abut against the rounded indentations 2251, 2261, and 2271.

Figure 4:
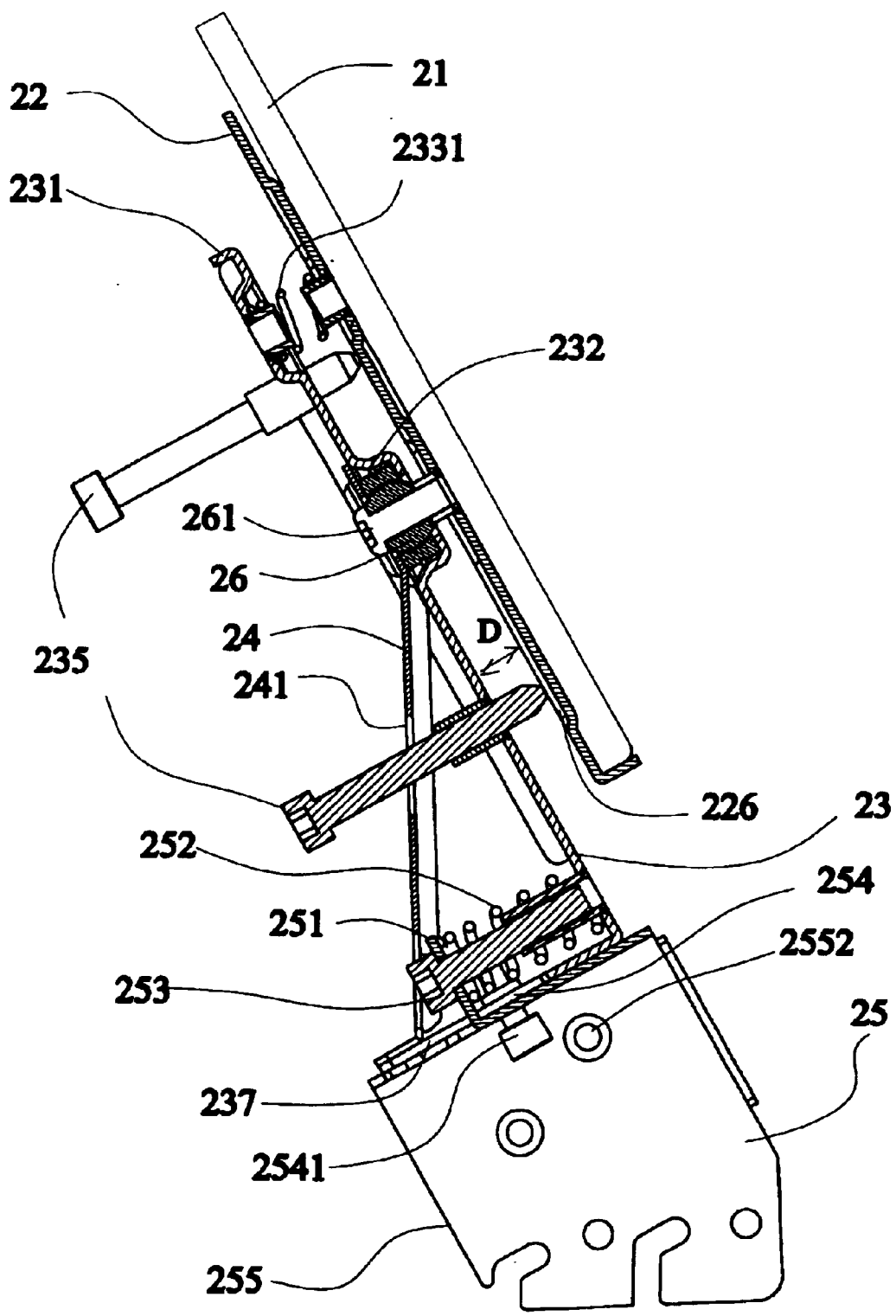
FIG. 4 is a cross-sectional view of an adjusting apparatus for projection of the invention.

Furthermore, the plane section 231 has an adjusting screw hole 236 at its lower side. One end of the base section 237, having a ⊓-shaped body, connects to the lower end of the plane section 231, and the other end has an opening 2374 through a center of the base section 237. Two positioning holes 2371 are respectively formed near two sides of the opening 2374. The base section 237 has two sides 2372 bending downward from a central part. At least one horizontal slot 2373 is formed on each side 2372. The holder 25 has a ⊓-shaped body of which width is smaller than the adjusting frame 23, and is placed below the base section 237 of the adjusting frame 23. A retainer 251 with a through hole 2511 externally extends from a top of the holder 25 to correspond the opening 2374. One end of a spring 252 is blocked by the retainer 251, and the other end of the spring 252 is inserted in the adjusting screw hole 236. A shift-adjusting bolt 253 passes through the through hole 2511 and spring 252, and then screws to the adjusting screw hole 236. The holder 25 has horizontal slots 254 corresponding to the positioning holes 2371. Positioning bolts 2541 passes through the slots 254 and screws to the positioning holes 2371 to connect the adjusting frame 23 and the holder 25. Two side portions 255 of the holder 25 respectively have at least one positioning screw hole 2551 corresponding to the horizontal slot 2373 of the side 2372. Referring to FIG. 4, positioning bolts 2552 pass the through the horizontal slot 2373 and screw to the positioning screw hole 2551 for guiding the adjusting frame 23 moving along the direction of the slot 2373.

Furthermore, the support plate 24 has a through hole 241 on the upper portion. The through hole 241 has a diameter smaller than the ball bearing 26. The fastening bolt 261 passes through the through hole 241. The upper portion of the support plate 24 covers the circular concave 232 and is screwed around the circular concave 232 to restrain the ball bearing 26 in the circular concave 232. A hole 242 is formed at a central portion of the support plate 24. One of the three angle-adjusting bolts 235 passes through the hole 242. A lower portion of the support plate 24 is fastened at both sides of the opening 2374 to increase the support of the adjusting frame 23.

Referring to FIG. 4, as loosening the positioning bolts 2541, 2552 and rotating the shift-adjusting bolt 253, one end of the spring 252 abuts against the retainer 251 and the other end abuts against the adjusting frame 23 to drive the adjusting frame 23 moving along the direction of the slot 254 and 2373 to a predetermined position, and then the positioning bolt 2541 or 2552 is screwed to fix the adjusting frame 23 onto the holder 25. Thereby, the adjusting apparatus 20 of the invention can provide shifting adjustment for the first mirror 21 to increase the freedom of the first mirror 21.

Angle adjustment of the first mirror 21 is described hereafter. When rotating angle-adjusting bolts 235 spaced away from each other at an angle of about 90° to vary the length D of the angle adjusting bolts 235, extending from the plane section 231 of the adjusting frame 23 to the carrier 22, the tilting angle of the carrier 22 can rotate around the center of the ball bearing 26 so as to adjust the tiling angle of the carrier 22. Furthermore, the angle-adjusting bolt 235 between the springs 2331 further varies the tilting angle of the carrier 22. Thereby the adjusting apparatus 20 can be provided to easily adjust the inclination angle of first mirror 21. Besides, the three angle-adjusting bolts 235 respectively abut against the rounded indentations 2251, 2261, 2271 at their round tips, so that one of the angle adjusting bolts 235 rotates for angle adjustment, the remaining adjusting bolts 235 keeping their position. Therefore, the images projected onto a screen are not deformed.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. An adjusting apparatus for projection, comprising:
 a carrier, having a central screw hole and three rounded indentations around the central screw hole;
 an adjusting frame, placed on the back of the carrier, the adjusting frame comprising a plane section having a circular concave for accommodating a ball bearing and three screw holes corresponding to the rounded indentations, a base section connecting to the lower portion of the plane section and having at least one slot, and a fastening bolt for connecting the adjusting frame to the carrier;
 three angle-adjusting bolts, respectively inserting through the screw holes to abut against the rounded indentations;
 a holder, placed below the base section of the adjusting frame and having at least one positioning screw hole corresponding to the slot of the adjusting frame; and
 at least one positioning bolt, inserting through the slot and screwing to the positioning screw hole.

2. The adjusting apparatus for projection of claim 1, wherein the plane section of the adjusting frame has an adjusting screw hole at its lower part, a retainer has a through hole and externally extending from a top of the holder, one end of a spring is blocked by the retainer and the other end of the spring inserts in an adjusting screw hole, and a shift-adjusting bolt inserts through the through hole to fix the spring to the adjusting screw holes.

3. The adjusting apparatus for projection of claim 2, further comprising an opening formed through a center of the base section of the adjusting frame, wherein the opening corresponds to the retainer.

4. The adjusting apparatus for projection of claim 1, further comprising a support plate placed on the back of the adjusting frame, wherein the support plate has a through hole with a diameter smaller than the ball bearing being, the through hole being formed through an upper portion of the support plate for receiving the fastening bolt, the upper portion of the support plate covering the circular concave and being screwed around the circular concave.

5. The adjusting apparatus for projection of claim 1, wherein the slot is formed through a top of the base section of the adjusting frame, and the positioning screw hole is formed on the top of the holder.

6. The adjusting apparatus for projection of claim 1, wherein the base section of the adjusting frame has two sides which bend downward from a central part, and the slot being formed on each side, and the holder has two side portions respectively having at least one positioning screw hole.

7. The adjusting apparatus for projection of claim 1, wherein the carrier has a recess in the front of the carrier.

8. The adjusting apparatus for projection of claim 1, further comprising a pin formed at each side of one rounded indention on the back of the carrier, and two restricting bolts mounted on the plane section of the adjusting frame to correspond to the pins so that the two springs are respectively restricted between one pin and one restricting bolt.

9. The adjusting apparatus for projection of claim 8, wherein two of the rounded indentations are spaced away from each other at an angle of about 90°, and the remaining rounded indention is placed on the opposite end of the rounded indentations.

10. The adjusting apparatus for projection of claim 1, wherein each of the angle-adjusting bolts has a round tip.

11. An adjusting apparatus for projection, comprising:
- a carrier, having a central screw hole, two rounded indentations around the central screw hole, and a pin formed respectively opposite to each of the rounded indentations;
- an adjusting frame, placed on the back of the carrier, the adjusting frame comprising a plane section having a circular concave for accommodating a ball bearing and two screw holes corresponding to the rounded indentations, a base section connecting to the lower portion of the plane section and having at least one slot, a fastening bolt for connecting the adjusting frame to the carrier, two restricting bolts corresponding to the pins of the carrier, and two springs placed between the restricting bolts and pins;
- at least two angle-adjusting bolts, respectively inserting through the screw holes to abut against the rounded indentations;
- a holder, placed below the base section of the adjusting frame and having at least one positioning screw hole corresponding to the slot of the adjusting frame; and
- at least one positioning bolt, inserting through the slot and screwing to the positioning screw hole.

12. The adjusting apparatus for projection of claim 11, wherein the rounded indentations are spaced away from each other at an angle of about 90°.

* * * * *